United States Patent [19]

Sewerinson

[11] 4,447,903

[45] May 8, 1984

[54] FORWARD ERROR CORRECTION USING CODING AND REDUNDANT TRANSMISSION

[75] Inventor: Ake N. Sewerinson, Port Coquitlam, Canada

[73] Assignee: AEL Microtel, Ltd., Burnaby, Canada

[21] Appl. No.: 266,230

[22] Filed: May 22, 1981

[51] Int. Cl.³ .................. G06F 11/00; G06F 11/14
[52] U.S. Cl. .......................................... 371/68; 371/67
[58] Field of Search .................. 371/68, 67, 22, 35; 364/200 MS File, 900 MS File

[56] References Cited

U.S. PATENT DOCUMENTS

| | | | |
|---|---|---|---|
| 3,781,795 | 12/1973 | Zegers | 371/68 |
| 4,001,692 | 1/1977 | Fenwick et al. | 371/36 |
| 4,011,542 | 3/1977 | Baichtal et al. | 371/68 |
| 4,118,686 | 10/1978 | Lender | 340/146.1 |
| 4,200,838 | 4/1980 | Poitevin | 371/68 |
| 4,225,961 | 9/1980 | Raggenbass et al. | 371/68 |
| 4,245,344 | 1/1981 | Richter | 371/68 |
| 4,251,873 | 2/1981 | Joby | 371/68 |
| 4,276,645 | 6/1981 | Lager et al. | 371/68 |
| 4,291,408 | 9/1981 | Ogawa et al. | 371/22 |
| 4,304,001 | 12/1981 | Cope | 371/68 |

OTHER PUBLICATIONS

Burton et al., "Errors and Error Control", *Proceedings of the IEEE*, vol. 60, No. 11, Nov. 1972, pp. 1293–1301.

*Primary Examiner*—Jerry Smith
*Assistant Examiner*—Gary V. Harkcom
*Attorney, Agent, or Firm*—Leonard R. Cool

[57] ABSTRACT

A forward error correcting digital transmission system having two separate transmission channels carrying redundant information. The signal on the first channel is encoded by combining each present bit with itself delayed m bits in time. The signal on the second channel may be encoded in the same manner only with a delay of n bits in time, or left without coding, i.e., n=0, in any case m and n are unequal integers. Both first and second channels are transmitted over separate transmission paths to the receiving terminal where each is independently decoded to obtain the original binary information from each received encoded signal.

If an error is introduced into one of the channels during transmission, the encoded information necessarily contains an error in the present bit and its associated m or n delayed bit. Upon detection of an error by simple bit comparisons between the two decoded channels, the present decoded bit and its associated delayed decoded bit, if any, are changed in the apropriate channel in order to correct for the error.

15 Claims, 12 Drawing Figures

FORWARD ERROR CORRECTION USING CODING AND REDUNDANT TRANSMISSION

BACKGROUND OF THE INVENTION

This invention relates to error correction in data systems and in particular to forward error correction by redundant transmission and encoding without adding non-information digits.

There are fundamentally two different techniques for improving the reliability of point-to-point binary data communication systems. One is commonly called Automatic-Repeat-Request (ARQ) and is characterized by the fact that the detection of errors in a transmitted block code initiates a request for re-transmission. A block code consists essentially of a group of information bits, buffered from adjacent groups, to which control and synchronization bits are attached. Such a combination forms a data block. The data block is then passed through an encoder which attaches a number of parity bits, resulting in the formation of the block code. These parity bits are used to determine if errors have been introduced in transmission. If no errors are detected, the group of information bits is delivered to the data destination and the receiving terminal notifies the sending terminal, through a suitable return channel, that the block has been correctly received. If discrepancies exist, the sending terminal is so notified and the block is re-transmitted. This assumes, of course, that the block is stored at the sending terminal until the acknowledgement or re-transmission request is received. Thus storage at the transmitting end as well as the receiving end is required.

The other fundamental technique for improving the reliability of point-to-point binary communication systems employs what is called Forward Error Control. Rather than to re-transmit blocks of the information when errors are detected, the decoder or associated equipment attempts to determine the location of errors from the pattern of discrepancies between the received and recalculated error bits. In prior-art systems, block codes are employed as are described for the ARQ technique previously described. In the instant invention, block codes are not employed and the location of the errors is derived from the encoding process and comparisons between the redundant transmission paths. Further, non-information carrying bits are not required.

SUMMARY OF THE INVENTION

A forward error-correction technique includes an encoder which first separates a binary signal into two paths each carrying the same information. The encoder processes the binary information in the first path to obtain a first encoded binary signal in which a present digit is combined with a past first encoded digit delayed by m bits. The binary information in the second path may not be encoded or it may be converted into a second encoded binary signal in which the present digit is combined with a past second encoded digit delayed by n bits. The two processed signals are transmitted to a receiver over two separate paths. At the receiver, a decoder processes said first and second encoded binary signals so as to obtain first and second decoded signals, each of which are representative of the original binary signal, respectively, at first and second output terminals, absent errors in transmission. First and second storage elements containing a like number of cells for storing the decoded information have their inputs respectively connected to the first and second output terminals of said decoder. A comparator having first and second input terminals, respectively, adapted to receive the first and second decoded signals from said detector, provides an error signal at an output whenever the inputs are of unlike states. An error correction circuit accepts the output signals from the comparator and corrects a present and the associated delayed digit, if any, in the appropriate storage element when an error is detected.

DETAILED DESCRIPTION OF THE INVENTION

Figure 1:
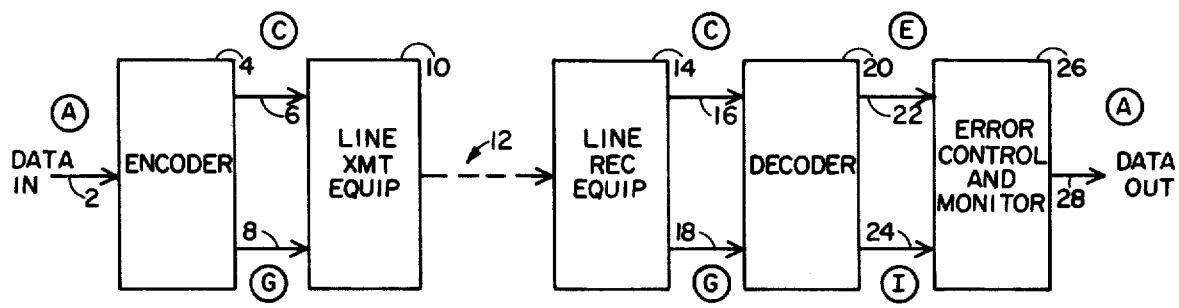
FIG. 1 is a block diagram showing the basic elements of a data transmission system, and includes the encoder, decoder, and error control and monitor functions of the instant invention.
Figure 2:
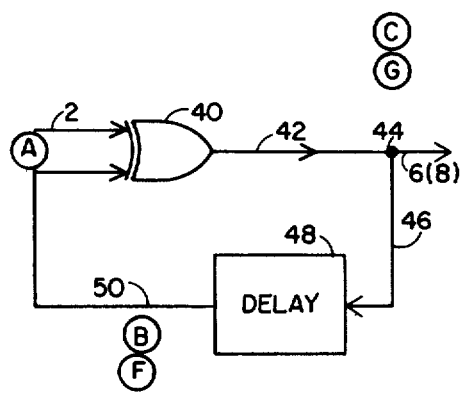
FIG. 2 is a block diagram of one of the encoding devices used in the encoder of one embodiment of the invention.
Figure 5:
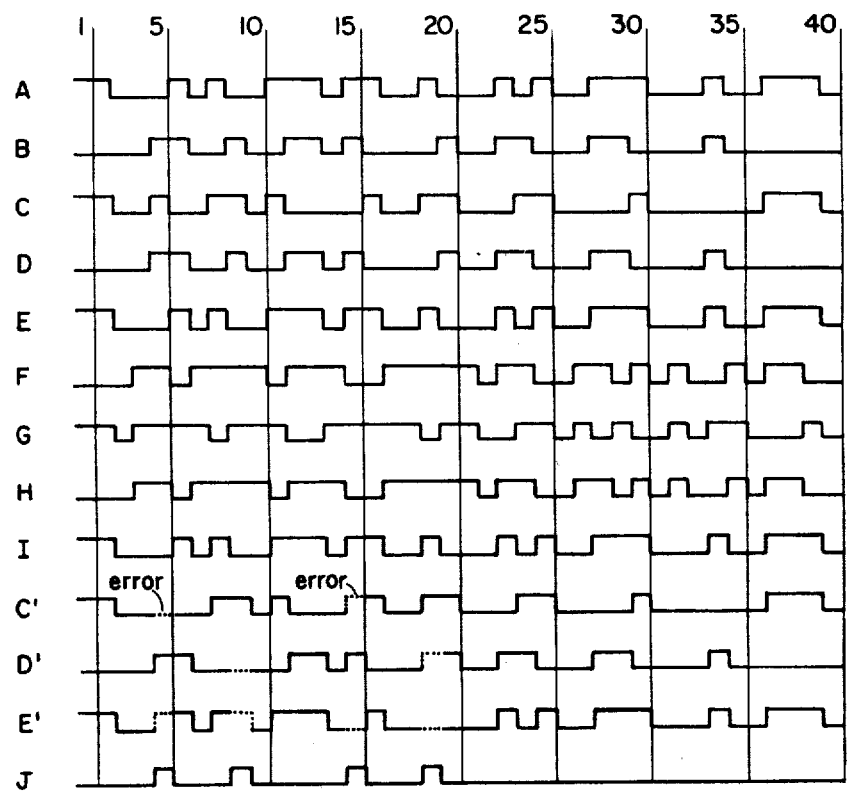
FIG. 5 is a waveform diagram showing the waveforms at various important points in said one embodiment of the invention, and illustrates the effect of an error in one path of the transmission system.

Referring now to FIG. 1, it may be seen that binary data is applied on path 2 to encoder 4. In a preferred embodiment of the invention encoder 4 consists essentially of two encoding devices one of which is shown in FIG. 2. The letter A in a circle relates to the waveform at the input to encoder 4. Other waveforms which appear at various critical portions of the circuit shown in FIG. 2 are also identified by a letter in a circle, and these waveforms are shown in FIG. 5. The waveform A is assumed to be the information bearing binary waveform (data) from a data source not shown. It may be seen that this data input is applied to a first input of an exclusive OR-gate represented as 40 in FIG. 2. The encoding device has a second input which is derived from the output via path 46, delay 48, which may be a shift register, and path 50. For this example, it is assumed that the encoding device connected to path 6 in FIG. 1 would have a delay of four digits in the feedback path. To simplify the analysis, it also is assumed that the delay 48 would have a "0" in each storage cell, initially, and this is shown in waveform B of FIG. 5, digit spaces 1–4. The encoded output which is to be applied to path 6 is shown as waveform C in FIG. 5. For the second encoding device which has an output applied to path 8, the delay is assumed to be three digit spaces and this is shown at waveform F in FIG. 5. Using the same digit input, waveform A, and the output of waveform F the second encoding device provides the waveform shown at G, FIG. 5, on path 8.

The coded outputs from encoder 4 are then applied via paths 6 and 8 to inputs of the line transmitting equipment shown as 10 in FIG. 1. This line transmitting equipment, the transmission path represented by 12 and the line receiving equipment shown at 14 can be made up in any number of ways. For example, this could be a carrier current system in which the two encoded outputs are transmitted via different carrier channels. The equipment could consist of two separate radio channels of a radio system which provides transmission between the transmitting and receiving ends of the system. Such equipment is well known and is not to be considered in detail here.

Figure 3:
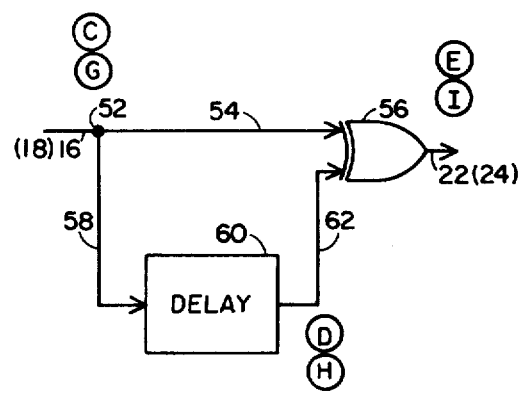
FIG. 3 is a block diagram of one of the decoding devices used in conjunction with said one embodiment of a decoder used in the instant invention.

Referring again to FIG. 1, it may be seen that at the receiving end the encoded information is applied via paths 16 and 18 to a decoder 20. As with the encoder 4, decoder 20 consists of two separate decoding circuits and a preferred decoding circuit is shown in FIG. 3. Here it may be seen that the encoded signal on path 16 is applied via path 54 to one input of an exclusive OR-gate 56. The identical signal but delayed by the appropriate interval, which is the same as the delay for the encoder, is inserted between path 16 and the other input of exclusive OR-gate 56. Thus there are four units delay between the waveforms shown at C and D in FIG. 5, and the output at E on path 22 is shown to be the same as the binary input on path 2, shown as waveform A, in FIG. 5. Again with respect to the other path, the decoding device which would be connected to receive the G input along path 18, shown in parenthesis in FIG. 3, will have a three digit delay interposed between path 18 and the input to the exclusive OR-gate of the second decoding device, and this is shown in the relationship between waveforms G and H of FIG. 5. Waveform I which would appear on path 24 is the decoded output and absent errors should be and is shown to be the same as waveform A of FIG. 5. The decoder outputs are applied to the inputs of error control and monitor 26, and this device is shown in more detail in FIG. 4.

Figure 4:
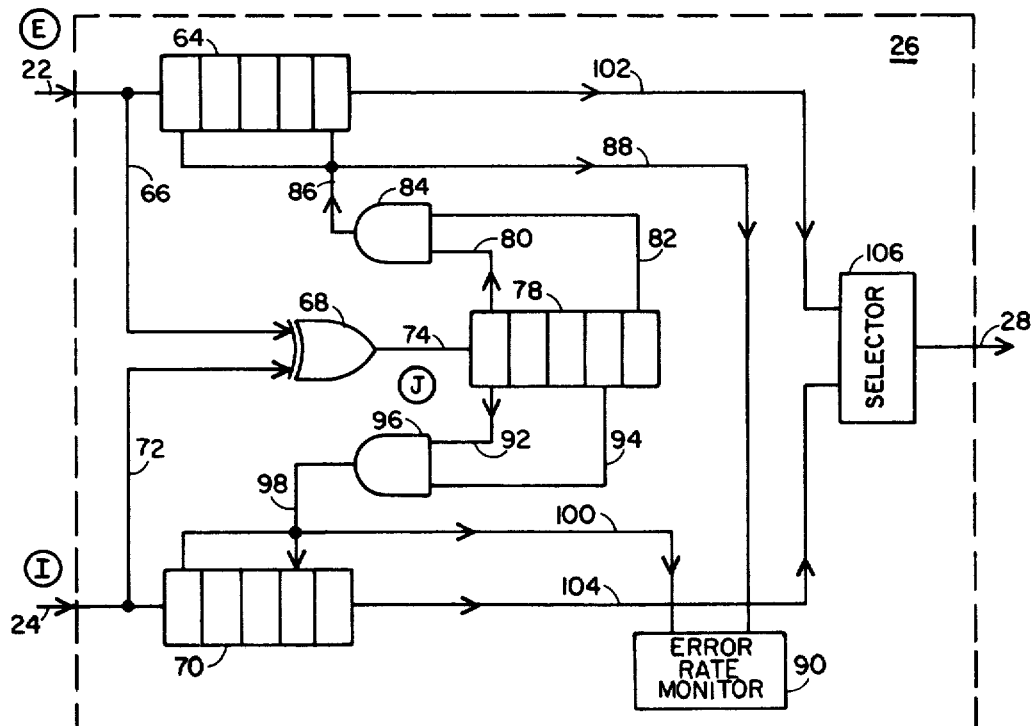
FIG. 4 is a block diagram of an error control and monitor circuit used in said one embodiment of the invention.

Referring to FIG. 4, it is seen that the decoded output on path 22 is applied to storage element 64, and the decoded output on path 24 is applied to storage element 70. These storage elements are shown to accept serially the input data and to serially read out the data, respectively, on paths 102 and 104. Further, the same number of storage cells are included in each storage element so as to obtain the same delay in each path. Of course, the number of storage cells must be at least equal to the larger of (m+1) or (n+1). Also it may be seen that there are parallel inputs to storage cells spaced (m+1) digits apart on storage element 64 and (n+1) digits apart on storage element 70. When a pulse appears on the parallel inputs to a storage element, only the state of the binary information stored in the appropriate storage cells is changed. For example, assume that the state is binary "0" in cells 1 and 5 of storage element 64. If a pulse appears on the parallel inputs to these cells, indicating an error has been detected as will be explained hereinafter, the state will be changed to binary "1". Of course, the opposite would occur if the original states were binary "1". These would be changed to binary "0".

The decoded inputs are applied to input terminals of gate 68 via paths 66 and 72 as shown. Correction takes place after the detection of an error. As noted hereinabove, absent errors in transmission the decoded signals on paths 22 and 24 are identical and are the same as the original binary information. However, an error occurrence such as shown at time slot 5 in waveform C', FIG. 5, results in decoded error signals appearing at time slots 5 and 9 (4 digits delay) as shown in waveform E'. This 4 digit delay is known as the error propagation interval and is introduced by the encoding process. A different error propagation interval is introduced for each channel. Thus, an error introduced in one channel during transmission results both in an original error and a propagated error in that channel. The second error is spaced from the original error by the delay interval. The decoded signals appearing on paths 22 (E') and 24 (I) are applied to exclusive-OR gate 68. If the signal inputs to gate 68 are like states, the output signal on path 74 is binary "0". Thus, a binary "0" represents a no error condition. But where an error has occurred and error signals appear as in waveform E' at time slots 5 and 9, the signal inputs to gate 68 are of unlike states and the output signal (error signal) on path 74 is binary "1". This is shown in waveform J. Register 78 accepts the output signals from exclusive OR-gate 68, and the binary states either "0" or "1" are stepped through the register. Based on our example system, register 78 has at least five cells, i.e., equal in number to the maximum delay introduced in the encoding process plus one. Parallel outputs are taken at cells 1 and 5 and applied to the inputs of AND-gate 84. Similarly, parallel outputs are taken from cells 1 and 4 and are applied to the inputs of AND-gate 96. The output terminal of AND-gate 84 is connected to the parallel inputs of cells 1 and 5 of storage element 64 and to one input terminal of error rate monitor 90. Similarly, the output terminal of AND-gate 96 is connected to the parallel inputs of cells 1 and 4 of storage element 70 and to a second input to error rate monitor 90.

So long as the decoded data on paths 22 and 24 have like states, the output of exclusive OR-gate 68 along path 74 will be "0". In this circumstance, neither AND-gate 84 nor AND-gate 96 will provide an error output signal. Thus the bits stored in the cells of storage elements 64 and 70 will not be affected. However, when an error occurs, then the states of the binary signal applied to the inputs of exclusive-OR gate 68 will be unlike and an error output signal will appear on path 74. Because of the coding involved, the appearance of the error will repeat at the delay interval of the particular path. This is shown in the lower part of the waveform diagram of FIG. 5 in which C' is shown to have an error at both time slots 5 and 15. In the decoding process, the waveform E' is obtained which now does not compare identically to the waveform I. This may be seen by again referring to these waveforms in FIG. 5. As noted above the error which occurs at time slot 5 causes an error to appear both at time slot 5 and also at time slot 9. These errors are applied via path 74 to shift register 78 where they are stepped through. It is to be noted that shift register 78 must have enough storage cells to accommodate the maximum delay plus one provided by the encoding or decoding process. Since our maximum delay was four digits, register 78 has to store at least five digits. It could be, of course, longer, but this is not necessary.

In our example, consider the situation five time periods after the error that occurs in the fifth time slot as shown in waveforms C' and E'. The first error (waveform E', time slot 5) will then be stored in the fifth storage cell of register 64 and the second resulting error (waveform E', time slot 9) will be stored in the first storage cell of register 64. Likewise, the error digits from time slots 5 and 9 of waveform J will be stored in cells 5 and 1, respectively, of error register 78. Consequently, positive pulses representing the error signals will appear on paths 80 and 82 and these error signals are applied to the two inputs of AND-gate 84. Because of the character of the error signals, AND-gate 84 then provides an outut on path 86 which causes the binary digits stored in cells 1 and 5 of register 64 to change state. By so doing, the error has been corrected and an error-free output is applied along path 102 to one input of selector 106. Note that the output of storage register 70 is applied along path 104 to a second input of selector 106. It is the function of selector 106 to select the output from one or the other of the two paths as desired and there are many well known techniques by which such selection may be achieved. In addition to the error correction arrangement, an error rate monitor 90 monitors the outputs which appear as output pulses from either of the AND-gates 84 or 96. Error rate monitors may either count the number of errors or the output pulses may be used to charge a capacitor. In either case, a level is set which, when exceeded, would cause an alarm indication, alerting personnel to a problem in transmission. Error rate monitors are well known and will not be further discussed.

Figure 6:
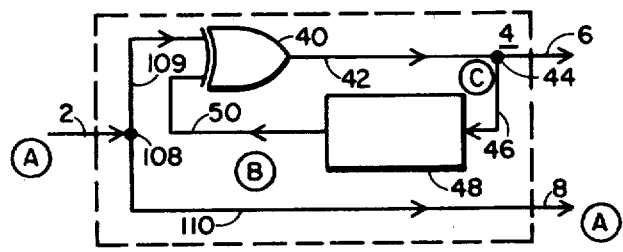
FIG. 6 is a block diagram of an encoder which is used in a second embodiment of the invention where the signal on one path is encoded as described above and where the signal on the second path is sent without encoding.

A second embodiment of the encoder is shown in FIG. 6. Note here that the difference between the encoder shown here and the one previously described is that the encoding/decoding only occurs in one of the two parallel paths. Because operation of the encoding device is the same as that of the device shown in FIG. 2, a discussion of its method of operation is believed to be unnecessary here. The similarity is emphasized by the use of identical numbers to identify the various circuit components and features. Also, decoding will be the same as was described for FIG. 3. Further, operation of the error detection circuitry for the encoded path is accomplished as described for the first embodiment as shown in FIG. 4. However, for the non-coded branch, the error correction circuit operates somewhat differently as will be explained hereinafter.

Figure 7:
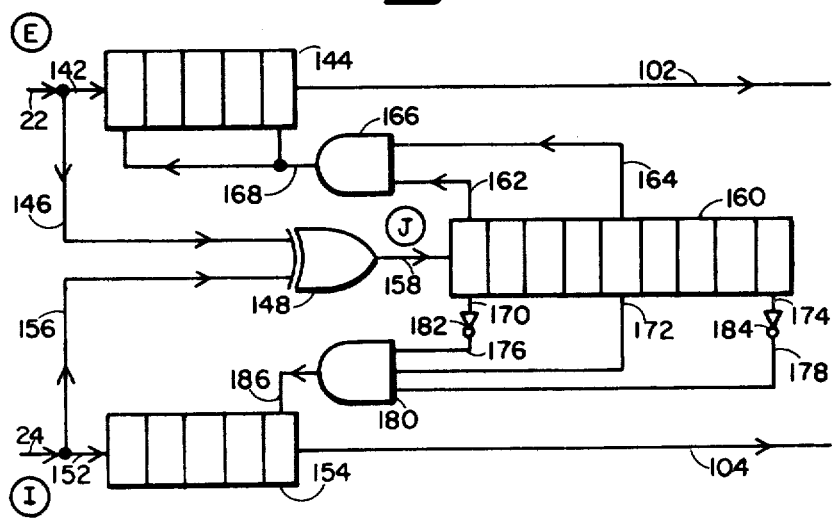
FIG. 7 is a block diagram of an error control circuit used in conjunction with said second embodiment.
Figure 8:
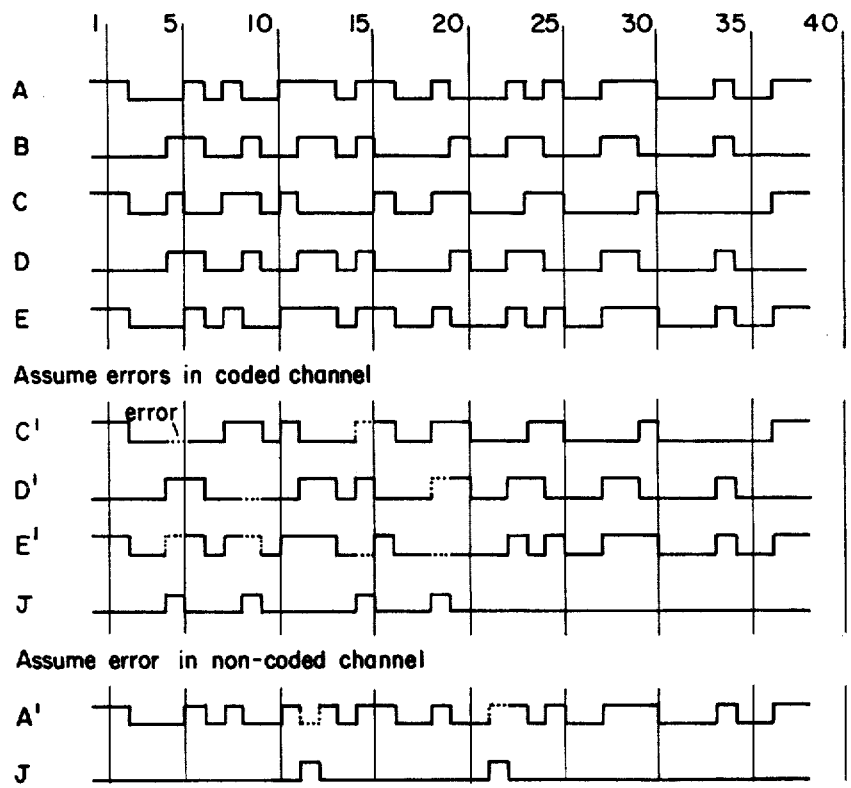
FIG. 8 is a waveform diagram which illustrates the waveforms which would exist at various important points in said second embodiment, and illustrates the effect of an error in either path.

Referring now to FIG. 7, it will be noted that the error register 160 has a minimum length of (2 m+1) cells. Again, a delay of 4 time slots is assumed to have been employed in the branch which contains the coded signal. Note that an error in the coded channel will result in two errors after decoding, these errors being spaced with an m time slot delay. In case of an error in the non-coded channel, only that one error will occur at path 24 and be shifted in to register 154. Also, only one difference signal, logic "1", will be generated in exclusive-OR gate 148 and shifted in to error register 160. The correction criterion for the non-coded channel is then one error only, specifically with digits m time slots on either side monitored to distinguish between errors in the non-coded and coded channels.

Referring now to our example and FIG. 7, a correction on the non-coded channel should be made when there is a logic "1" in storage cell 5 and logic "0"s in cells 1 and 9. Inverters 182 and 184, with their inputs connected via paths 170 and 174 from storage cells 1 and 9 of register 160, converts the logic "0"s to logic "1"s and are connected via paths 176 and 178 respectively to the first two inputs of AND-gate 180.

A third input to said AND-gate 180 has its input from storage cell 5 register 160. AND-gate 180 will now output an error correction signal, logic "1", when and only when one error signal occurs in register 160 and is not accompanied by another error displaced by m time slots. A binary "1" from AND-gate 180, will appear on path 186 and this in turn causes a change of state of the present bit in cell 5 of storage register 154.

Figure 9:
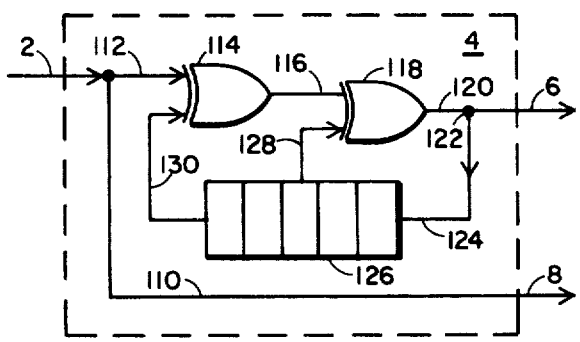
FIG. 9 is a block diagram of an encoder which is used in a third embodiment of the invention.
Figure 10:
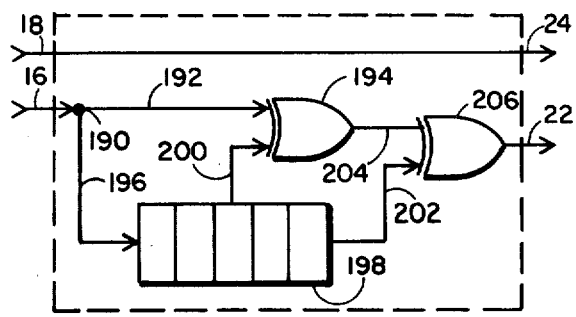
FIG. 10 is a block diagram of a decoder which is used in conjunction with said third embodiment.

A more complex encoding and decoding technique is shown in FIGS. 9 and 10. It should be noted that branch 110 of FIG. 9 could include the encoding technique shown in FIG. 2 or an equally complex encoding technique, rather than employing a non-coded signal path as is shown for this branch. To simplify the discussion, the branch 110 will be considered to be as shown and only the encoding in the other branch will be described.

Figure 11:
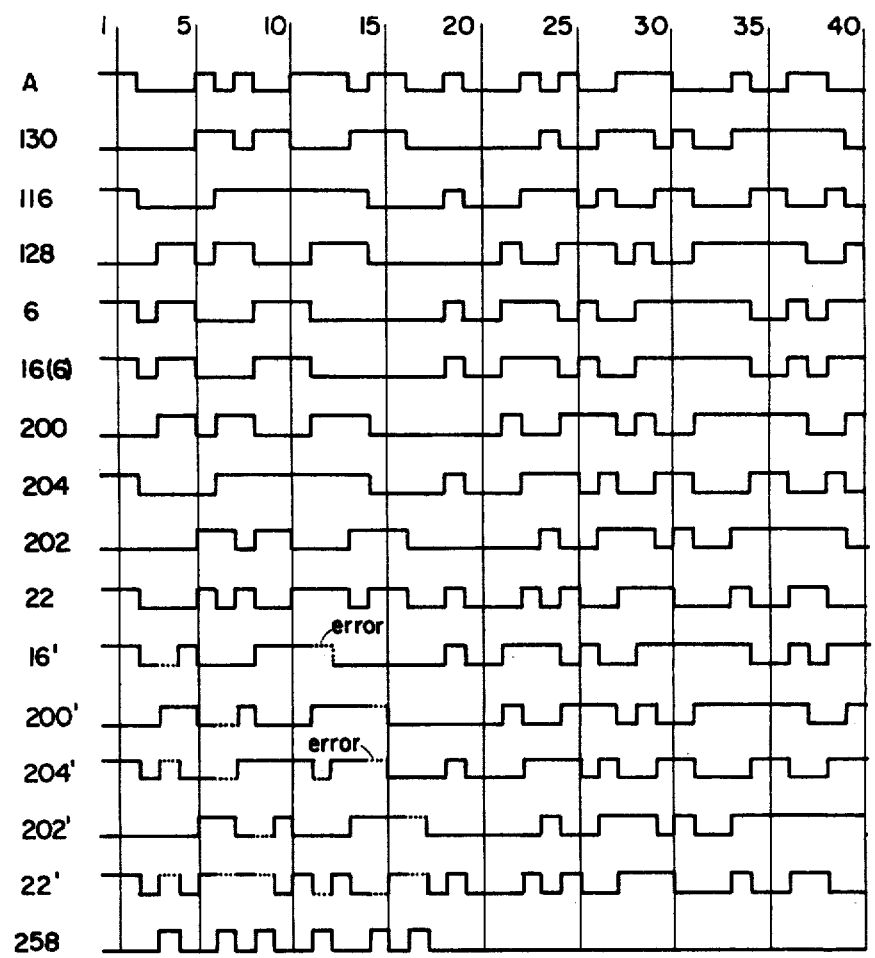
FIG. 11 is a waveform diagram showing waveforms which may appear at various important points in the encoding, decoding and error control portions of said third embodiment.

An understanding of the encoding process is most readily gained when the encoding device shown in FIG. 9 is considered in relation to the waveforms given in FIG. 11. Waveform A is the input data which is applied to both paths 110 and 112. Delay 126 is shown to have a 5 time slot delay (5 bits) between paths 124 and 130, i.e., the output of exclusive-OR gate 118 and one input of exclusive-OR gate 114. In the more general case we will call the delay between paths 124 and 130 p time slots. To simplify the explanation, it is assumed that all of the cells in delay 126 are initially binary "0". This is shown in waveform 130, FIG. 11. It is also to be noted that the output of delay 126 on path 128 has a delay of 3 time slots (in more general terms q time slots), and this is shown in waveform 128, FIG. 11. Inputs on paths 112 and 130 are combined in exclusive-OR gate 114 to produce an output signal on path 116 which appears as waveform 116 in FIG. 11. The binary signal on path 116 is applied to one input of exclusive-OR gate 118 and is combined with the binary input on path 128 to produce the coded output signal which appears at path 120, output terminal 6. This coded output signal is also applied to the input of delay 126. Thus, the binary character of the waveforms 128 and 130 follow the encoded output signal, but delayed by 3 and 5 time slots, respectively.

The decoder shown in FIG. 10 reverses the encoding process, absent errors in transmission. The input is shown on path 16. Referring to the waveform diagram, FIG. 11, it is to be noted that the waveform shown at 16(6) is the same as that at 120(6). Waveform 200, 202, 204 and 22 graphically illustrate the effect of the decoding process at several critical points including the decoded output waveform 22. Note that this latter is the same as the original binary input signal shown as waveform A.

Waveform 16' differs from 16 in that errors are introduced at time slots 4 and 12, as indicated by the dotted lines. Subsequent decoding of waveform 16' as is accomplished by the decoding device shown in FIG. 10 indicates that errors occur in three time slots for each error introduced. Further, as shown by waveform 258, FIG. 11, the output of the error detector shows that an error appears at the present time slot, the third time slot and the fifth time slot which conforms to the delays introduced in the encoding process.

Figure 12:
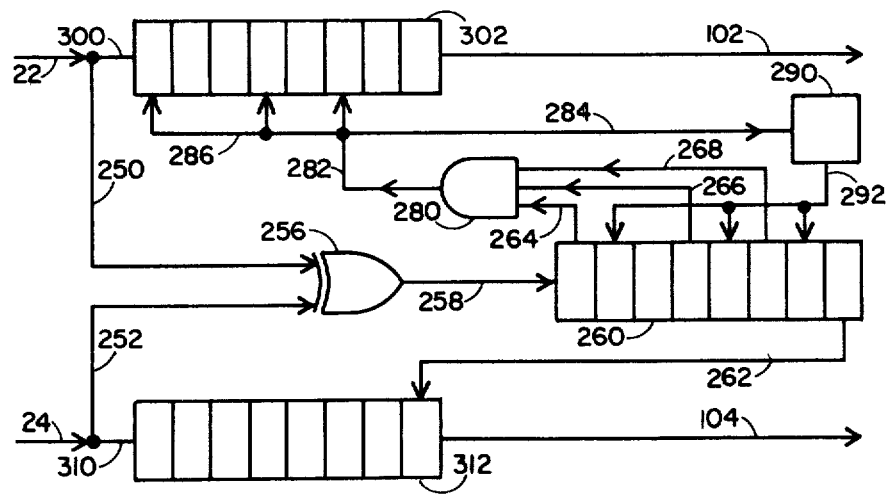
FIG. 12 is a block diagram of an error control circuit used in conjunction with said third embodiment.

The error correction technique for this third embodiment will be explained using the error correction circuitry shown in FIG. 12. Decoded bit streams on paths 22 and 24 are connected to exclusive-OR gate 256 via paths 250 and 252. Gate 256 will output a logic "1" in case of different signal content on paths 22 and 24 and logic "0" otherwise. This is like the first and second embodiments as shown in FIGS. 4 and 7. The error register 260 has a minimum length of (p+3) bits. The first (p+1) bits are used for the detection of the error pattern which will follow one error of the coded digital data on path 16 as described above. During such an event register cells 1, (q+1) and (p+1) will simultaneously contain logic "1"s. AND-gate 280 has its inputs connected via paths 264, 266 and 268 to the register positions mentioned above, and will output a logic "1" with the occurrence of this error event. The error correction signal connects via paths 282 and 286 to cells 1, (q+1) and (p+1) of storage register 302, and inverts the content of these register positions. This, then, accomplishes the desired error correction on the coded channel. The error correction signal also enters a one time slot delay unit, 290, via path 284. The output of said delay unit connects via path 292 to register cells 2, (q+2) and (p+2) of error register 260. These parallel inputs to register 260 will act as follows. A logic "0" on the input will not alter the state of the logic information contained in the cell. A logic "1" on the parallel input will cause the content of the cell to become logic "0". This means that the error signal resulting from an error in the coded channel will be "erased" when in the second, (q+2) and (p+2), cells of register 260 through the action of delay unit 290. The single error pulse caused by an error in the non-coded channel will not be "erased" and when in cell (p+3) of register 260, will through connection 262 initiate the required error correction in the (p+3) cell of register 312.

Of course, a different coding process could have been used in the non-coded path in which case the error correction circuitry would be adapted to make the correction in accordance with the encoding process used. Such an error correction circuit could be readily derived based upon the teaching of the instant invention.

While the invention has been shown and described with reference to preferred embodiments thereof, it will be understood by those skilled in the art that change in form and detail may be made therein without departing from the spirit and scope of the invention.

What is claimed is:

1. In a digital data transmission system having a transmitting terminal, a receiving terminal, a transmission path connecting the two terminals, and a source of binary data at said transmitting terminal, apparatus for performing forward error correction, which comprises:
    means for converting said binary data into redundant first and second binary pulse trains;
    encoding means adapted to accept said first and second binary pulse trains for independently encoding said binary data in said first and second binary pulse trains to obtain first and second encoded binary pulse trains that provide different error propagation intervals in each encoded pulse train;
    means, at said receiving terminal, for separately decoding said first and second encoded binary pulse trains to obtain third and fourth binary pulse trains, each of which contains the original binary data absent the effect of path error introduction in said transmission path;
    means for comparing bit occurrences in said third and fourth decoded binary pulse trains to determine if an error has occurred;
    means responsive to a detected error and to subsequently detected errors occurring at said error propagation intervals to determine in which said data channel said path error occurred; and
    means for correcting the bits in the decoded pulse train in which said errors have occurred.

2. In a digital data transmission system having a two-channel transmitter, a two-channel receiver, a transmission path for interconnecting said transmitter to said receiver, and a source of binary data, apparatus for performing forward error correction, comprising:
    means for converting said binary data into redundant first and second binary pulse trains;
    encoding means coupled to said converting means and to said two-channel transmitter for encoding independently said first and second binary pulse trains, said encoding means generating a first encoded pulse train by combining said first binary pulse train with said first encoded pulse train delayed m bits in time, where m equals a non-zero integer, and said encoding means also generating a second encoded pulse train by combining said second binary pulse train with said second encoded pulse train delayed n bits in time, where n is an integer different from m;
    decoding means coupled to said two-channel receiver for independently decoding the encoded binary data, said decoding means generating separate third and fourth binary pulse trains;
    comparison means for comparing each binary pulse in said third binary pulse train with a corresponding binary pulse in said fourth binary pulse train and generating an error signal when there is a lack of correspondence between said third and fourth binary pulse trains;
    detection means responsive to said error signal and to a delay interval between successive error signals for determining which binary pulse train contains an error; and
    means for selectively correcting errors in said third and fourth binary pulse trains in response to said detection means and thereby producing a received pair of binary pulse trains free of errors in transmission.

3. In a digital system which has first and second parallel transmission channels, thus permitting simultaneous redundant transmission of serial binary data, from a data source, between transmitting and receiving ends of said system, apparatus for performing forward error correction, which comprises:
    an encoder which accepts the binary information for processing at an input terminal from which said information is simultaneously applied to two divergent paths, in which only one of the paths includes a coding device in which the present digit is combined with its previously encoded digit delayed by m bits, the information processed in said first and second paths appearing at first and second output terminals;

transmission means having first and second input terminals adapted for connection to said first and second encoder output terminals, for conditioning said processed information for simultaneous transmission over separate channels to a receiving terminal;

receiving means, having an input connected to receive said conditioned information, for providing at first and second output terminals, respectively the original binary information and the encoded information, absent errors introduced in transmission between said transmitting and receiving ends;

a decoder having first and second input terminals connected, respectively, to the first and second output terminals of said receiving means, said decoder including a device in one path decoding means in which a present encoded digit is combined with its own encoded digit delayed by m bits so as to provide, at first and second output terminals, signals which are identical to the original binary information, absent errors introduced in transmission;

storage means having first and second input terminals connected, respectively, to the first and second output terminals of said decoder, for storing at least (m+1) bits from said first path in a first storage element and a like number of bits from said second path in a second storage element, said storage means having third and fourth input terminals connected to the first and (m+1) cell of first storage element, and a fifth input terminal connected to the (m+1) cell of said second storage element;

means connected to said storage means for detecting error occurrences in said first and second paths and providing an error signal at an output when errors occur; and means responsive to said error signal for applying error correction signals to said third, fourth and fifth terminals to correct error appearances in the appropriate one of said paths.

4. In a digital data system for the transmission of binary information, apparatus for correcting errors, comprising:

an encoder which accepts the binary information at an input terminal and provides at a first output terminal a first encoded binary signal in which the present digit is combined with a past encoded digit delayed by m bits and at a second output terminal a second encoded binary signal in which the present digit is combined with a past encoded digit delayed by n bits; where m and n are unequal integers and either m or n may be 0;

a transmitter which accepts said first and second encoded binary signals and conditions them for simultaneous transmission to a receiving terminal;

a receiver having an input connected to receive said conditioned signals and providing at first and second output terminals the first and second encoded binary signals;

a decoder, having first and second input terminals connected, respectively, to the first and second output terminals of said receiver, and providing at first and second output terminals of said decoder decoded signals which are identical to the transmitted data absent errors introduced in transmission or recovery;

storage means having first and second input terminals connected, respectively, to the first and second output terminals of said decoder, for storing at least (n+1) bits from said first output terminal of said decoder in a first storage element, and at least (n+1) bits from said second output terminal of said decoder in a second storage element, said storage means having third and fourth input terminals connected to the first and (m+1) cells of said first storage element, and fifth and sixth input terminals connected to the first and (n+1) cells of said second storage element;

means connected to said storage means for detecting error occurrences appearing at said decoder first and second output terminals and providing an error signal at an output when errors occur; and means responsive to said error signal for applying error correction signals to said third and fourth, and fifth and sixth input terminals of said storage means as appropriate to correct error appearances in the appropriate one of said storage elements.

5. Apparatus as set forth in claim 4 wherein said means for detecting comprises:

a comparator having first and second input terminals connected, respectively, to said first and second output terminals of said decoder, said comparator provided said error signal at said output of said detecting means only when the binary states simultaneously appearing on the two decoder output terminals are unlike.

6. Apparatus as set forth in claim 5 wherein said means responsive comprises:

a third storage element having an input terminal connected to the output terminal of said comparator, said third storage element having at least either (m+1) or (n+1) cells, whichever is larger;

a first logic circuit having first and second input terminals connected to the first and (m+1) cells of said third storage element, and having an output terminal connected to the first and (m+1) cells of said first storage element; and a second logic circuit having first and second input terminals connected to the first and (n+1) cells of said third storage element, and having an output terminal connected to the first and (n+1) cells of said second storage element.

7. Apparatus as in claim 4 wherein said encoder comprises:

a first exclusive-OR gate having one input connected to the encoder input terminal, having an m bit delay element connected between the output and a second input of said first exclusive-OR gate and providing a first encoded binary signal at said first output terminal;

and a second exclusive-OR gate having one input connected to the encoder input terminal, having an n bit delay element connected between the output and a second input of said second exclusive-OR gate and providing a second encoded binary signal at said second output terminal.

8. Apparatus as in claim 4 wherein said decoder comprises:

a third exclusive-OR gate having one input connected directly to the first decoder input terminal, having an m bit delay connected between said first encoder input terminal and a second input to said third exclusive-OR gate, and having the output of said third exclusive-OR gate connected to the decoder first output terminal; and a fourth exclusive-OR gate having one input connected directly to the second decoder input terminal, having an n bit delay connected between said decoder second input and a second input to said fourth exclusive-OR gate, and having the output of said fourth exclusive-OR gate connected to the decoder second output terminal.

9. In a digital transmission system adapted to accept and condition serial binary data from a data source for transmission over an appropriate transmission path, said system having a transmitting and receiving terminal end interconnected by said transmission path, apparatus for performing forward error correction, which comprises:

an encoder adapted to accept, at an input terminal, said serial binary data and first to convert said data into redundant first and second binary pulse trains, respectively, and then separately converting said first and second binary pulse trains into first and second encoded binary pulse trains which appear at first and second output terminals, each of said encoded pulse trains containing the same information as was contained in said serial binary data, and said encoder introducing a different predetermined error propagation interval in each of said encoded pulse trains which will affect any error introduced following encoding of the encoded pulse train;

a decoder, at the receiving terminal end, having first and second input terminals adapted to accept said first and second encoded binary pulse trains and to provide, at first and second output terminals, respectively, first and second decoded binary pulse trains containing the original binary data from said data source and transmission errors, said transmission errors causing an error at the bit time slot of the error occurrence and at said predetermined error propagation interval only for the pulse train in which the error occurs; and an error corrector having first and second input terminals connected, respectively, to the first and second output terminals of said decoder, said error corrector being responsive to the error occurrences and to each predetermined error propagation interval of the decoded binary pulse trains so as to determine in which pulse train an error was introduced and to effect correction of the detected error.

10. Apparatus as set forth in claim 9 wherein said encoder comprises:

means for separating the serial binary data into redundant first and second binary pulse trains which are available, respectively, at first and second output terminals of said separating means;

an m digit delay circuit having an input terminal and an output terminal;

an exclusive-OR gate having one input terminal connected to the first output terminal of said separating means, having an output terminal connected to the first output terminal of said encoder and to the input terminal of said m delay circuit, and having a second input terminal connected to the output terminal of said m delay circuit, whereby an encoded binary pulse train is provided at said exclusive-OR gate output terminal; and a through path between said second output terminal of said separating means and the second output terminal of said encoder, whereby the second binary pulse train is not encoded.

11. Apparatus as set forth in claim 10 wherein said error corrector comprises:

first and second storage elements each having (m+1) cells, numbered from 1 to (m+1) from the input terminal, the input to the first storage element being connected to the decoder first output terminal and the input to the second storage element being connected to the decoder second output terminal;

a second exclusive-OR gate having first and second inputs connected respectively to the first and second output terminals of said decoder, said second gate providing a pulse at its output when the inputs are of unlike states indicating an error occurrence;

a third storage element having (2m+1) cells numbered consecutively from 1 to (2m+1) from the input, said input being connected to the output of said second exclusive-OR gate, and the state of the output of said second gate being stepped through said third storage element at the binary data rate;

a first logic circuit having first and second inputs, respectively, connected to the first and (m+1) cell outputs of said third storage element and having an output connected to both the first and (m+1) inputs of said first storage element, said first logic circuit complementing the bits stored in said first and (m+1) cells of said first storage element when an error pulse appears in both the first and (m+1) cells of said third storage element; and a second logic circuit having first, second and third inputs, respectively, connected to the first, (m+1) and (2m+1) cell outputs of said third storage element and having an output connected to the (m+1) cell input of said second storage element, said second logic circuit complementing the bit stored in said (m+1) cell of said second storage element when a pulse appears in the (m+1) cell and the first and (2m+1) cells are pulse free.

12. Apparatus as set forth in claim 9 wherein said encoder comprises:

means for separating the serial binary data into said first and second binary pulse trains which are available, respectively, at first and second output terminals;

a delay circuit having p storage cells and having an input terminal connected to the first cell, a first output terminal connected to the pth cell, and having a second output terminal connected to the qth cell, where q is an integer less than p;

a first exclusive-OR gate having a first input terminal connected to the first output terminal of said separating means, having a second input terminal connected to the first output terminal of said delay circuit, and having an output terminal;

a second exclusive-OR gate having a first input terminal connected to the output terminal of said first exclusive-OR gate, having a second input terminal connected to the second output terminal of said delay circuit and providing an encoded binary signal at an output terminal; and a through path between said second output terminal of said separating means and the second output terminal of said encoder, whereby the second binary pulse train is not encoded.

13. Apparatus as set forth in claim 12, wherein said error corrector comprises:

first and second storage elements each having at least (p+3) cells, numbered from 1 to (p+3) from the input terminal, the input to the first storage element being connected to the decoder first output terminal, and the input to the second storage element being connected to the decoder second output terminal;

a third exclusive-OR gate having first and second inputs connected, respectively, to the first and second output terminals of said decoder, said third gate providing a pulse at its output when the inputs are of unlike states indicating an error occurrence;

a third storage element having at least (p+3) cells numbered consecutively from 1 to (p+3) from the input, said input being connected to the output of said third exclusive-OR gate, and the state of the output of said third gate being stepped through said third storage element at the binary data rate;

a first logic circuit having first, second and third inputs, respectively, connected to the first, (q+1) and (p+1) cell outputs of said third storage element, having a first output terminal connected to the inputs of the first, (q+1) and (p+1) cells of said first storage element, said logic circuit complementing the bits stored in said first, (q+1) and (p+1) cells when an error pulse appears in the first, (q+1) and (p+1) cells of said third storage element, and a second output terminal connected to the second, (q+2) and (p+2) cells of said third storage element, a clearing pulse being provided following the detection of an error in said first path, whereby the error pulses are deleted from the cells of the third storage element.

14. Apparatus as set forth in claim 13 wherein said first logic circuit comprises:

an AND-gate having first, second and third inputs connected, respectively, to said first, (q+1) and (p+1) cells of said third storage element and having an output; and a one bit delay circuit having an input connected to the output of said AND-gate and having an output connected to the input of the second, (q+2) and (p+2) cells of said third storage element, whereby the detection of an error by correspondence of these error pulses at the inputs to AND-gate provides a clearing signal to eliminate these error pulses as they are transferred to the next cell.

15. Apparatus as in claim 9 wherein said error corrector comprises:

a comparator having first and second inputs connected, respectively, to the first and second input terminals of said error corrector, said comparator providing an error signal to an output terminal when bits in corresponding time slots of the decoded binary pulse trains are unlike;

a first storage means including a plurality of storage cells for temporarily storing a predetermined number of bits obtained from the output terminal of said comparator, said bits being shifted from cell to cell at the binary rate, and having a first and second set of parallel output terminals each set being separately connected to appropriate cells of said first storage means so that each set has their connections spaced apart by the appropriate predetermined error propagation intervals, respectively, for said first and second pulse trains;

a first error correction circuit having a first input terminal connection to the first input terminal of said error corrector, having second and third input terminals connected to said first set of output terminals from said first storage means, and having an output terminal;

a second error correction circuit having a first input terminal connected to the second input terminal of said error corrector, having second and third input terminals connected to said second set of output terminals of said first storage means, and having an output terminal.

* * * * *